Sept. 19, 1950  G. G. SOMERVILLE  2,523,071
ELECTROMAGNETIC INDUCTION APPARATUS
Filed June 1, 1944  4 Sheets-Sheet 4
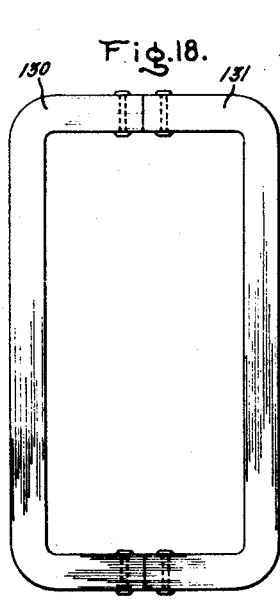
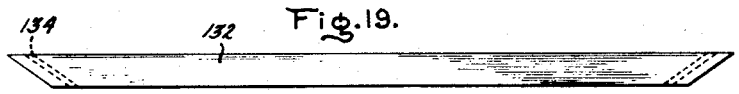
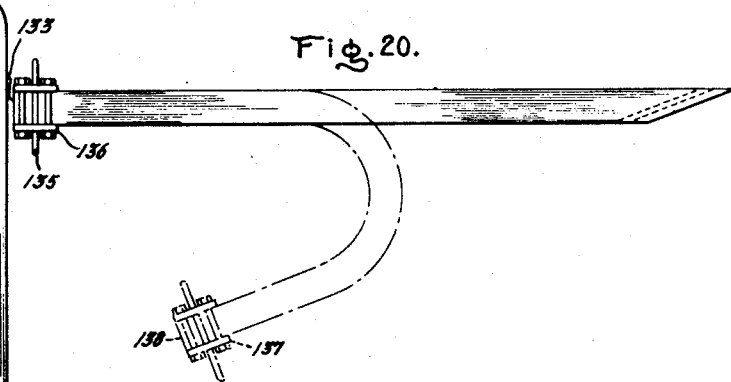
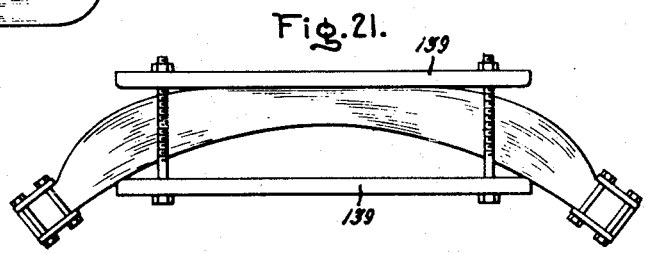
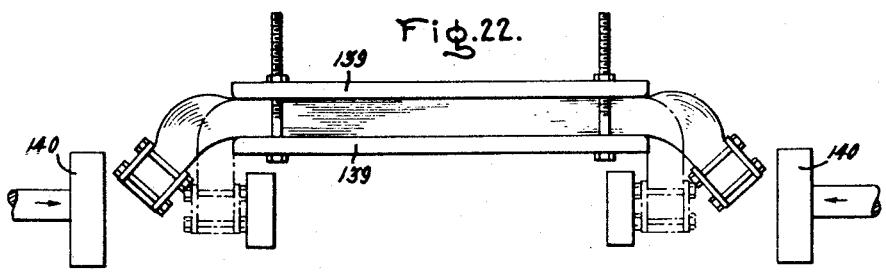
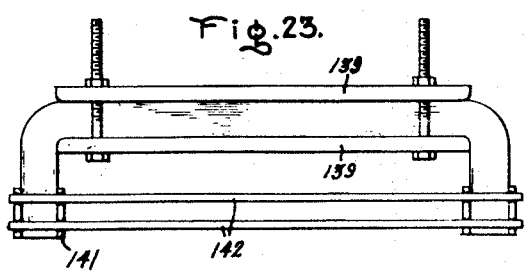
Inventor:
Gareth G. Somerville,
by Harry E. Dunham
His Attorney.

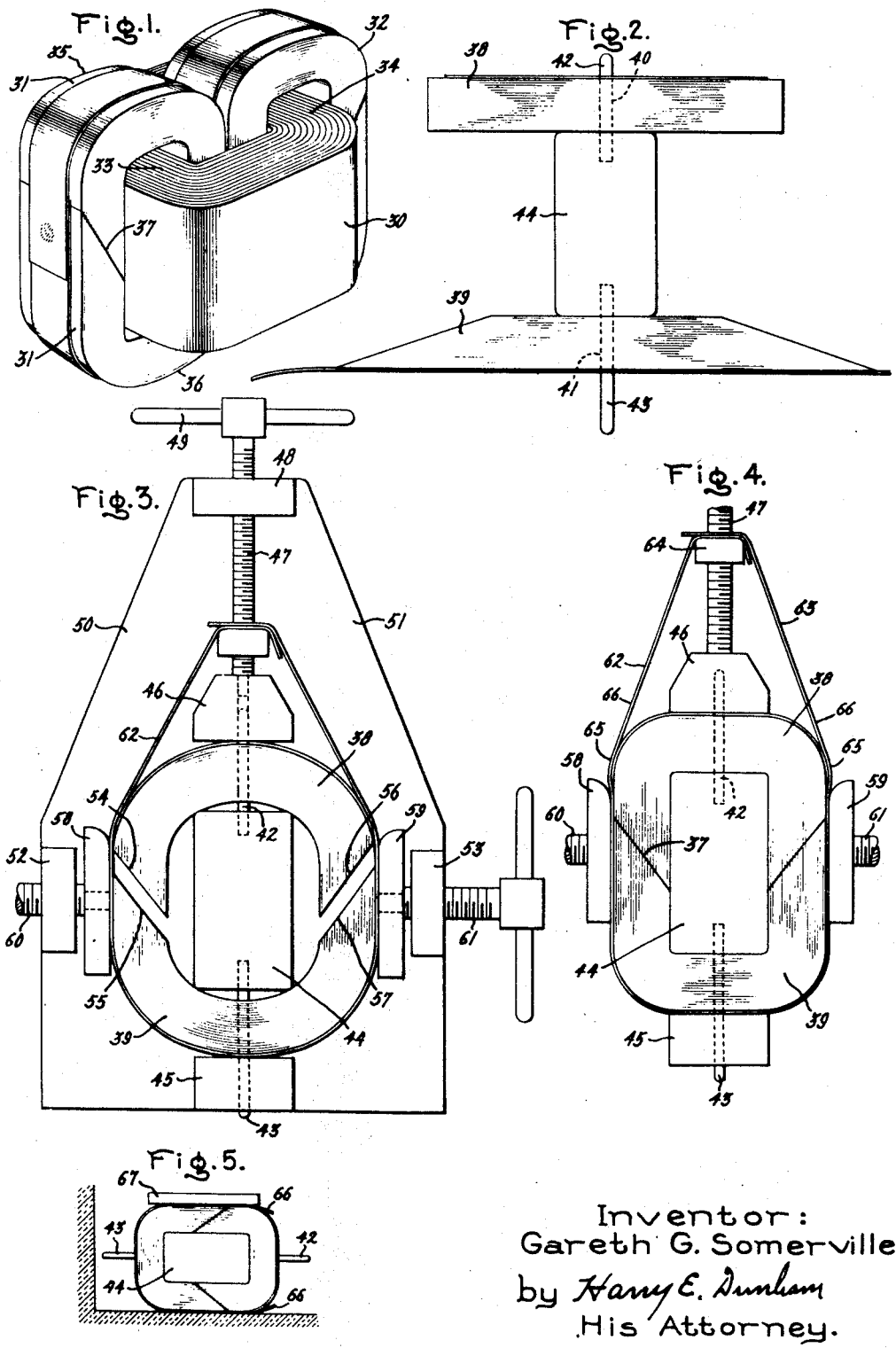
Sept. 19, 1950 — G. G. SOMERVILLE — 2,523,071
ELECTROMAGNETIC INDUCTION APPARATUS
Filed June 1, 1944 — 4 Sheets-Sheet 1
Inventor:
Gareth G. Somerville,
by Harry E. Dunham
His Attorney.

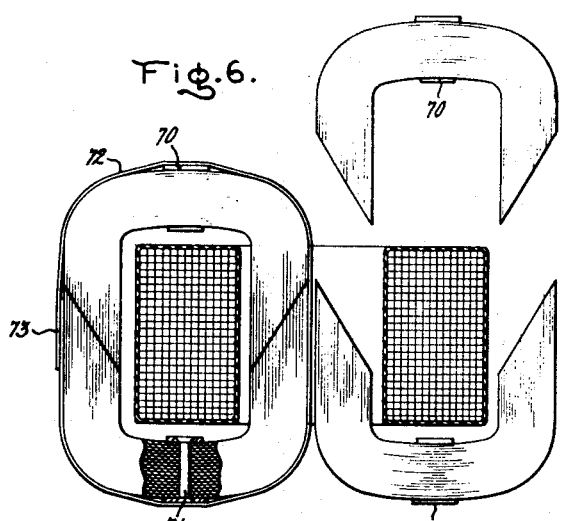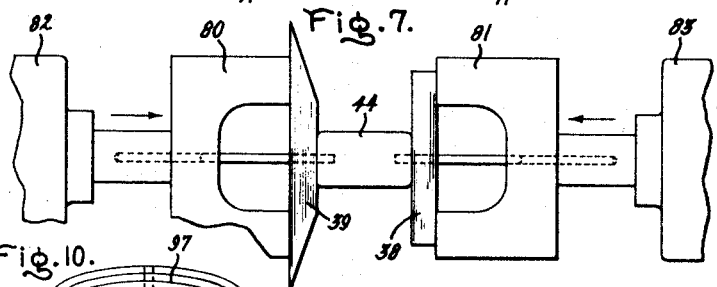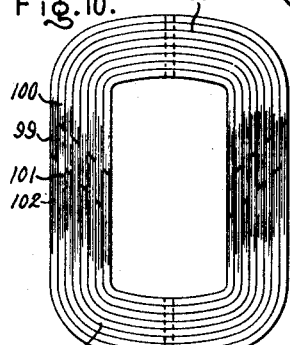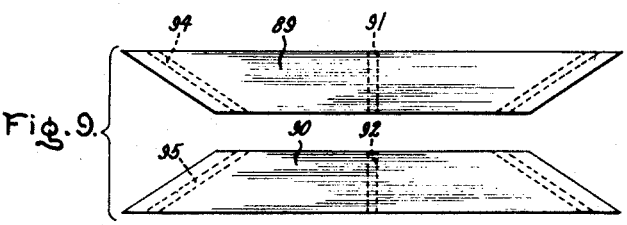

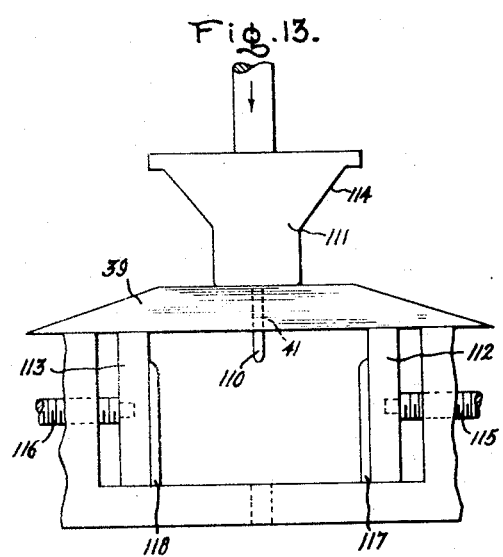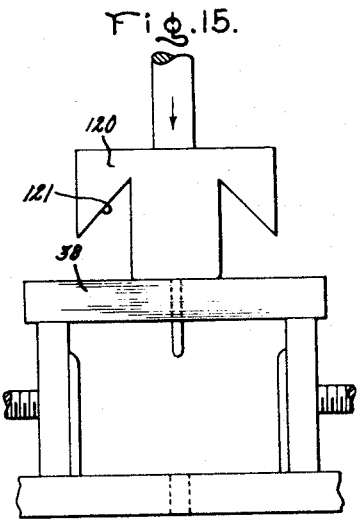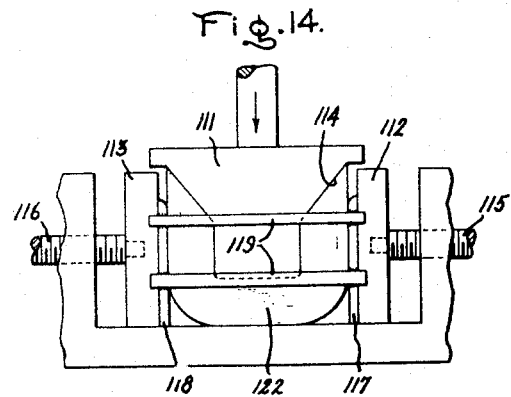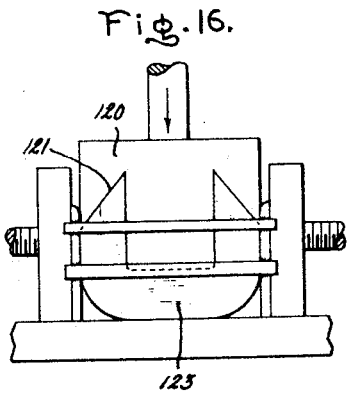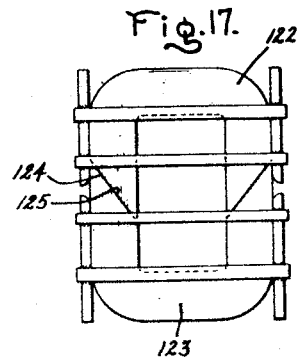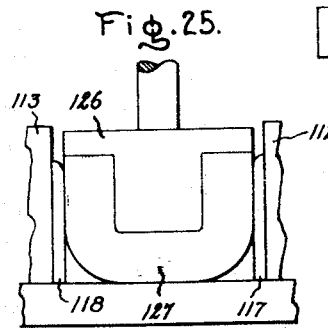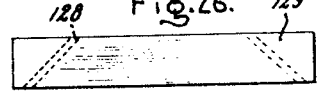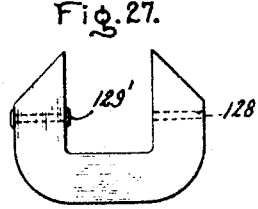

Patented Sept. 19, 1950

2,523,071

UNITED STATES PATENT OFFICE 2,523,071

ELECTROMAGNETIC INDUCTION APPARATUS

Gareth G. Somerville, Pittsfield, Mass., assignor to General Electric Company, a corporation of New York Application June 1, 1944, Serial No. 538,303

2 Claims. (Cl. 175—356)

My invention relates to electromagnetic induction apparatus, to magnetic cores of the curved iron type, and to a method of forming the curved iron type core.

Heretofore it has been customary to form electromagnetic induction apparatus, particularly for application in the low frequency or power frequency field, with magnetic cores formed of a plurality of assembled flat punchings, or by flatwise bending or winding a strip of magnetic material to produce a bent or wound type core. In the high frequency field the cores have been produced of powdered iron bonded together with a suitable binder.

A core formed of highly directional steel which is wound in the form of a spiral so that the flux will pass along the most favorable magnetic direction throughout the entire periphery of the core will have a relatively low core loss, and such a core has been used for sometime in instrument type bushing current transformers since with this type of transformer it is not necessary to disturb the core to assemble it with the primary winding, as the primary winding usually includes a single conductor which passes through the ring shaped core, with a few turns of secondary distributed through and around the ring shaped core. Also, although it has been known since the latter part of the last century that cores may be made of the flatwise bent type, for instance as shown in British Patent 7,856 of 1889, it has been customary to form cores for electromagnetic induction apparatus by assembling the flat punchings; and apparently one reason for this was the difficulty which was experienced in assembling an annealed wound core with a preformed conductive winding structure without bending the magnetic material beyond its elastic limit, as bending beyond this limit destroys or deteriorates considerably the magnetic properties of the steel.

In my application Serial No. 536,748, filed May 22, 1944, now Patent No. 2,456,457, and assigned to the same assignee as this present invention, I have described and claimed a curved iron type core for electromagnetic induction apparatus which may be efficiently applied to a relatively wide range of transformer sizes and which includes at least two groups of magnetic sheets which have been precut to the desired size. The sheets are then assembled by inserting first sheets of one group and then sheets from the other group within a ring shaped member so as to produce a generally circular shaped closed core construction. Pressure may then be applied to the inside and outside surfaces of the ring so as to suitably align the adjacent ends of the corresponding sheets from each of the groups. The core may then be expanded to the desired shape, annealed, and after annealing, one group is disassembled from the second to form two core portions which portions may then be reassembled around the preformed conductive winding structure.

It is an object of the present invention to provide an improved method of forming a core of the above-mentioned type.

It is another object of my invention to provide an efficient method of forming a curved iron type magnetic core which may be assembled with a preformed conductive winding structure to produce an efficient electromagnetic induction apparatus.

It is a further object of my invention to provide an electromagnetic induction apparatus with an improved core of the curved iron type.

Further objects and advantages of my invention will become apparent from the following description referring to the accompanying drawing, and the features of novelty which characterize my invention will be pointed out with particularity in the claims annexed to and forming a part of this specification.

Referring to the drawing, Fig. 1 is a perspective view of an electromagnetic induction apparatus which has been formed according to my invention; Fig. 2 is a side view of two groups of sheets of magnetic material which are used to produce the cores of the apparatus of Fig. 1; Figs. 3 and 4 illustrate steps of my improved method of assembling the groups of magnetic sheets to produce the core of Fig. 1; Fig. 5 illustrates the assembled magnetic sheets placed in an annealing oven; Fig. 6 is a sectional side elevation of one of the cores assembled around one leg of the conductive winding and another core in the process of assembly; Fig. 6a is an enlarged view of a portion of the joint of Fig. 6; Fig. 7 illustrates a machine which may be used to bend the groups of sheets; Fig. 8 illustrates a modified type of core construction which may be formed according to my improved method; Fig. 9 illustrates two groups of magnetic sheets which form the core of Fig. 8; Fig. 10 illustrates another core construction which is formed according to my invention; Fig. 11 illustrates two groups of magnetic sheets used to form the core of Fig. 10; Fig. 12 illustrates the two groups of magnetic sheets of Fig. 11 as they are assembled before being flatwise bent; Figs. 13 to 16 illustrate groups of magnetic sheets being bent and formed according to a modification of my improved method; Fig. 17 illustrates the two U-shaped core portions formed according to the method of Figs. 13 to 16, the core being ready for its strain-relief anneal; Fig. 18 is a sectional side elevation of a magnetic core formed according to a modification of my improved method; Fig. 19 illustrates a group of magnetic sheets used to form one of the core portions of Fig. 18; Fig. 20 illustrates the group of sheets of Fig. 19 during the process of being flatwise bent; Figs. 21 to 23 illustrate further steps in bending and forming the group of magnetic sheets of Fig. 20; and Figs. 24 to 27 illustrate further modifications of the method of forming the core.

Referring to Fig. 1 of the drawing, I have illustrated an electromagnetic induction apparatus having a preformed coil winding 30 with two similar cores 31 and 32 surrounding legs 33 and 34, respectively, of the preformed conductive winding structure 30. Each of the core portions 31 and 32 includes generally U-shaped core portions 35 and 36 with a suitable butt joint 37 between corresponding ends of the legs of the generally U-shaped core portions. In Fig. 1, I have illustrated the joint 37 as being what I term a scarfed butt joint, but it will be seen that, as the description proceeds, any suitable type of joint construction may be produced according to my improved method. Although two cores are shown as linking a single conductive winding structure, it will be understood that my improved method may be used to form any suitable number of conductive winding structures and to produce any suitable type of electromagnetic induction apparatus, such as a transformer or reactor. Furthermore, my invention may be used to produce an electromagnetic induction apparatus for a wide range of sizes and applications, such as cores employing relatively thin magnetic strips such as 2 mil to produce relatively small transformers for high frequency applications, to cores using relatively thick strip such as 14 mil for the larger type transformers.

In order to produce the core illustrated in Fig. 1, I provide two groups of magnetic sheets 38 and 39, as is shown in Fig. 2. These sheets of magnetic material may be formed of any suitable strip such as highly directional strip steel having the most favorable magnetic direction running longitudinally of the sheets. The two groups 38 and 39 of magnetic sheets have approximately the same number and the sheets have such length so that corresponding sheets from each group when assembled will have a total length equal to the peripheral distance around the core at that particular layer in the finished core. Thus given the size of the finished core the designer can calculate the length of each of the sheets in the two groups which will be used to form the finished core. It will also be seen that by the use of various combinations of lengths of sheets in the two groups, any suitable type of scarfed or butt or overlap joint may be provided as will be brought out more clearly below.

In the production of a scarfed butt joint as shown in Fig. 1 and indicated by the numeral 37, I provide the one group 38 with each sheet having the same length. The sheets forming the group 39, however, have progressively different lengths, the shortest length being used at the inner perimeter of the finished core and the corresponding longer lengths being used toward the outer periphery. The magnetic sheets may be cut to size in any suitable manner such as measuring by hand and cutting to the proper size or they may be cut on my improved index shearing machine, described and claimed in my application Serial No. 539,255, filed June 8, 1944, now Patent No. 2,369,617, and assigned to the same assignee as this present invention. Such an index shearing machine will produce sheets of progressively different lengths so as to produce the group 39. Furthermore, openings or holes 40 and 41 may be punched in each of the sheets as they are cut. These holes may be punched in any suitable place on the sheet and in the two groups of sheets 38 and 39 the holes are punched in the longitudinal center of each of the sheets.

In order to assemble the two groups of sheets 38 and 39 to produce the core as illustrated in Fig. 1, the sheets after being assembled in the manner illustrated in Fig. 2 are flatwise bent to produce two generally U-shaped core portions. This bending may be accomplished in any suitable manner and when the sheets are relatively thin and flexible they may be bent by hand. The sheets may of course also be bent in a suitable machine, as will be described below in connection with Fig. 7. However, even though the sheets are cut as accurately as possible and the holes are placed as near as possible in the longitudinal center of the sheets, when they are bent to form two generally U-shaped members, the ends of the sheets may not be placed in the exact desired position in relation to the corresponding sheet of the adjacent leg of the other core portion so that the corresponding sheets may abut relatively tightly together to produce a low loss joint. In order therefore to insure a relatively low loss joint by providing a relatively tight butt joint between the ends of corresponding sheets in the adjacent legs of each of the generally U-shaped core portions, I suitably apply pressure at least in a direction generally parallel with the magnetic sheets in the legs of the U-shaped members so that the adjacent ends of corresponding sheets which are to fit relatively tightly together will be put in equivalent planes. The application of this pressure may be accomplished in any suitable manner and in Figs. 3 and 4, I have illustrated structure for accomplishing this step in my improved method.

As will be seen with reference to Fig. 2 the group 38 is assembled with the openings 40 in alignment with the pin 42 passing through the opening 40. Similarly a pin 43 passes through the openings 41 of the sheets of the group 39. The pins extend outwardly from opposite surfaces of a mandrel 44 so that upon application of the pressure to each of the groups in a direction toward the mandrel 44 the sheets will each be bent as a group to form two generally U-shaped portions. While the sheets are in this position they may be introduced into the machine, as is illustrated in Fig. 3, which includes two diametrically opposed blocks 45 and 46, the blocks having suitable openings to receive the ends of the pins 42 and 43. In order that pressure may be applied to the core portions in a general direction parallel with the plane of the sheets in the legs of the core portions, blocks 45 and 46 are relatively movable. Thus the block 45 may be relatively stationary and the block 46 cooperates with an end of a screw 47. The upper end of the screw includes a nut 48 which is internally threaded with the screw 47. The outer end of the screw 47 has a handle 49 which may be grasped by the operator. Suitable supporting members 50 and 51 are attached to the nut 48 and to relatively stationary supporting members 52 and 53. It will therefore be seen that upon turning the handle 49 in a suitable direction, the screw 47 will be forced downwardly and therefore force the adjacent ends 54, 55, 56, and 57 of the U-shaped core portions toward each other.

In order to give the finished core a generally rectangular or oblong shape the machine in Fig. 3 includes movable blocks 58 and 59 which are diametrically opposed and positioned so that force may be applied to the core portions in a general direction perpendicular to the legs of the generally U-shaped core portions. The blocks 58 and 59 cooperate with screws 60 and 61, the screws passing through threaded openings in the stationary supports 52 and 53. It will be seen that by turning the screws 60 and 61, the legs of the core portions may be forced toward the mandrel 44. It will be understood that the core may be suitably formed by rotating each of the screws 47, 60, and 61 progressively or together in suitable amounts until the core attains the position as is illustrated in Fig. 4. It will be seen in Figs. 3 and 4 that a strap 62 of suitable material such as metal already surrounds the core portions, the ends of the strap having openings through which the screw 47 extends. Thus one end of the strap is passed over the end of the screw 47 and the strap is then wrapped completely around the closed core. Another end 63 of the strap then has an opening through which the screw 47 extends. A nut 64 is placed underneath the ends of the strap and it will be seen upon turning the nut so as to force the ends 62 and 63 away from the core, that the strap may be placed relatively tightly around the core portions. The strap may then be spot welded at the points 65 and the strap then cut as indicated by the numeral 66.

The core portions with their ends suitably positioned in abutting relation are now in condition for obtaining the strain-relief anneal, and Fig. 5 illustrates the core stacked in a furnace to obtain the strain-relief anneal. A weight 67 may be placed on the core so as to hold the sheets in place until the anneal is completed. After the core has been removed from the strain-relief anneal furnace it is ready to be assembled with a performed coil winding. It will be understood that the strain-relief anneal gives each of the sheets a permanent set in the relative positions they have in the furnace so that the sheets will naturally tend to maintain themselves in the same relative position they had in the furnace. However, in order to further insure that the sheets will not be disturbed upon removal of the supporting band 62, the pins 42 and 43 upon removal may be replaced with rivets 70 and 71, respectively. Any other suitable means may be provided to hold the sheets in their proper position. The band 62 may then be removed and the generally U-shaped core portions disassembled as is illustrated in Fig. 6. The core portions may then be introduced with the corresponding legs of each of the generally U-shaped core portions in abutting relation and with one of the legs projecting into the window of the preformed coil. A band 72 may then be placed around the U-shaped core portion and pulled relatively tightly together and then attached in any suitable manner such as by spot welding the band portions as is illustrated by the numeral 73.

Since the adjacent ends 54, 55, and 56, 57 were made to fit relatively tightly together to form a low loss butt joint according to the method described above, so long as the sheets are not disturbed the core portions may be disassembled and reassembled around the preformed coil as illustrated in Fig. 6, and the corresponding sheets of each of the generally U-shaped core portions will fit with a relatively tight butt joint in the same position they had when the core was removed from the strain-relief anneal furnace.

It will be understood that with a scarfed butt joint as shown in Fig. 6, since the sheets have the same thickness, the entire end edge of each sheet will not be in one plane as is indicated for convenience of illustration in Fig. 6, but the joint will in fact have a stepped construction as is indicated in Fig. 6a. The ends could, however, if desired, be formed in one substantial plane by grinding the edges.

As was mentioned above in connection with Fig. 2, when the groups of sheets are assembled they may be flatwise bent in any suitable manner, and in Fig. 7, I have illustrated a machine for carrying out this bending operation. The machine includes two relatively movable U-shaped form members 80 and 81. It will be understood that the internal surface of the U-shaped members 80 and 81 has a suitable size for producing the particular core construction desired. Operating cylinders 82 and 83 are provided so as to force the forms 80 and 81 toward the mandrel 44. This will cause the magnetic sheets in the groups 38 and 39 to be flatwise bent together and to be formed in a generally U-shape. It will be understood that the core portions may then be introduced into the machine as is illustrated in Fig. 3 and described above, or the ends of the sheets may be forced together while in the press of Fig. 7 and the sheets then suitably bound in the desired position until they are annealed.

As has been mentioned, any suitable type of joint construction may be formed in the core according to my invention, and in Fig. 8, I have illustrated a construction having a butt joint which instead of being scarfed is perpendicular to the plane of the sheets in the leg portions. Thus in Fig. 8, I have illustrated two core portions 85 and 86 with butt joints 87 and 88 between the adjacent ends of corresponding legs of the two generally U-shaped core portions. The core portions 85 and 86 are formed by bending flatwise two groups of magnetic sheets as described above in connection with Figs. 1 through 7. The two groups that form the core portions of Fig. 8 are illustrated in Fig. 9 and are identified by the numerals 89 and 90.

In order to produce the particular joint configuration it will be seen that both of the groups 89 and 90 are formed of sheets having progressively different lengths, the smaller sheets of each group forming the inner layer of the finished core and the longer sheets forming the outer layer. The sheets are also formed with openings 91 and 92 in the longitudinal center line of the sheets to facilitate stacking and for accommodating rivets 93. The sheets may also be formed if desired with openings or holes 94 and 95 near the ends of the sheet. The holes in each of the sheets are placed the same distance from the ends of the sheets so that when the groups are bent in the form of the U's the holes will be in general alignment so that rivets 96 may be passed through the holes. It will be understood that these rivets may be introduced at any suitable time during the production of the cores such as after they are removed from the strain-relief anneal. Instead of rivets any other means may be used for binding the sheets together, such as by applying a bead of weld metal as is shown at 107 in Fig. 24.

In Fig. 10, I have illustrated a core construction formed according to my improved method which core has an overlap butt joint. The core includes two generally U-shaped core portions 97 and 98 with the ends of a suitable number of layers in each of the portions being staggered. Thus one layer 99 of the core portion 97 extends beyond the ends of the adjacent layers 100. Similarly a layer 101 of the adjacent leg of the core portion 98 extends beyond a layer 102 of the core portion 98. In order that the projecting layers will be relatively stiff and will find their suitable position in relation to adjacent layers when the core is assembled around the preformed coils, any suitable number of magnetic sheets may be employed to produce each of these layers, and when using 14 mil strip two to six magnetic sheets for each of the layers is a suitable number.

In order to produce the core portions 97 and 98, two groups of magnetic sheets 103 and 104 are cut as is illustrated in Fig. 11. These sheets may be cut in any suitable relative lengths in order to produce the desired overlapping construction, and since the overlap joint is of the general scarfed type in Fig. 10 both of the groups 103 and 104 are formed of sheets having progressively different lengths. In order to produce the overlap joint the sheets of the groups 103 and 104 when they are cut are provided with holes 105 and 106, respectively, which holes are offset the same amount from the longitudinal center of the sheets. The sheets may be cut with the offset holes in any suitable manner such as by the machine described and claimed in my patent application Serial No. 539,255, referred to above. The sheets are then assembled by longitudinally reversing the sheets of the various layers and the general idea of so assembling magnetic sheets to produce an overlap butt joint is described and claimed in my application Serial No. 536,748, referred to above. The sheets of groups 103 and 104 are assembled on pins 42 and 43 of the mandrel 44. It will be seen that the layers are assembled with adjacent layers having ends projecting in opposite directions. Thus the first layer 99 has the longer side thereof in relation to the opening 105 projecting to the left of the pin 42, while the adjacent layer 100 has its longer side projecting to the right of the pin. The sheets such as four to six at a time may be assembled in this manner to provide a plurality of layers with overlapping ends. The sheets may then be flatwise curved and then assembled together in the machines as illustrated in Figs. 3 and 4 so as to relatively tightly butt the corresponding layers of each of the adjacent legs of the U-shaped portions.

As has been mentioned above the cores may be assembled flatwise bent and then pressure applied to the ends of the sheets forming the two legs of the generally U-shaped portions in any suitable manner and in Figs. 13 to 16, I have illustrated another method of bending and applying the pressure to a group of sheets. Thus referring to Fig. 13 the group of sheets 39 is assembled with a pin 110 passing through the openings 41. The pin 110 extends from a forming piston 111, and the stack 39 is supported on the edges of vertical side members 112 and 113 of a forming jig. Upon pushing the piston 111 downwardly as shown by the arrow, the group of sheets 39 will be flatwise bent into a generally U-shaped configuration, as is illustrated in Fig. 14. It will also be seen that the forming piston or body 111 has surfaces 114 in a plane of the finished scarfed butt joint 37 of the construction illustrated in Fig. 1. Thus by pressing on the ends of the sheets by the surfaces 114 the ends, or corresponding edges, will be made to lie in a single plane. In order to suitably support the sheets, the members 112 and 113 are movable in a direction at right angles to the movement of the piston 111. The walls 112 and 113 may be moved in any suitable manner such as by connection to screws 115 and 116, respectively. It will be understood that pressure may be applied by the piston 111 and the blocks 112 and 113 moved toward the core simultaneously or progressively so as to produce the desired butt joint. In order to hold the various sheets in the desired position after this position has been produced due to the pressure of the piston 111 and the blocks 112 and 113, bracket members 117 and 118 are provided between the adjacent surfaces of the core portion and the blocks 112 and 113. It will be seen that the bracket portions 117 and 118 are within the jig before the group of sheets 39 is forced into the jig. Connecting bars 119 may be placed between the brackets 117 and 118 and welded thereto so as to tightly hold the sheets in the position as is illustrated in Fig. 14. It will be understood that similar bars 119 may be placed on the opposite side.

In order to produce the U-shaped core portion which cooperates with the one shown in Fig. 14 to produce a completed magnetic core, a group of sheets 38 is similarly formed as is illustrated in Figs. 15 and 16. Since a scarfed butt joint is being produced when the group of laminations 38 is formed in a general U-shape with the legs extending upwardly, a piston 120 is provided with surfaces 121 which surfaces are in a different plane from the surfaces 114. The surfaces 121, however, are suitably formed relative to the surfaces 114 that upon the U-shaped core portion as shown in Fig. 16 being inverted, the edges of the sheets produced by the surfaces 121 will abut relatively tightly with the edges of the sheets produced by the surfaces 114. After the core portion has been formed as is illustrated in Figs. 15 and 16 the core portions 122 and 123 may be assembled as is illustrated in Fig. 17 and placed in an annealing furnace to be given a strain-relief anneal. When the core portions 122 and 123 are assembled in the manner illustrated in Fig. 17 with the edges 124 and 125 in abutting relation the corresponding sheets of the two legs of each of the core portions will be caused to butt even tighter together during the strain-relief anneal. After annealing, the core portions 122 and 123 may be removed and assembled around the preformed coil as is described above in connection with Fig. 6.

It is to be understood, however, that instead of assembling the core portions 122 and 123 together before placing in the strain-relief anneal furnace, the core portions 122 and 123 may be separately stacked and placed in the annealing furnace and then removed and assembled together with a coil winding.

It will be understood that any other suitable type of joint may be formed according to the method described above in connection with Figs. 13 through 16, and in Fig. 25, I have illustrated a piston construction 126 for forming a butt joint on a core portion 127 which joint is in a plane substantially perpendicular to the plane of the sheets in the legs of the core portion.

In Figs. 26 and 27, I have illustrated a modified method of aligning the ends of a core portion which includes providing openings 128 in a group of laminations 129 suitably positioned so that after the group of sheets is bent to form a U-shaped core the openings 128 will be placed in general alignment. The sheets may then be suitably manipulated in case the holes of each of the sheets do not line up properly so that a rivet 129′ may be introduced through the holes when they are placed in registry. This will produce a joint construction in which the edges are placed in substantially a single plane, although the edges may not be quite as accurately positioned as they may be by the method which includes applying a force to the sheets in the manner described above in connection with Figs. 1 through 7, or Figs. 13 through 16.

In Figs. 18 to 23, I have illustrated a core construction and a method of producing the core when the groups of laminations are relatively long and flexible. Thus Fig. 18 illustrates a core including core portions 130 and 131 each of which has a generally U-shaped construction. Each of the core portions 130 and 131 is formed by bending a group of laminations of progressively different lengths, as is illustrated in Fig. 19. The group of sheets 132 is assembled by placing the adjacent ends at one end 133 in alignment. This may be accomplished by having openings 134 placed close to the ends of the sheets, each of the openings 134 of each sheet being the same distance from the end of the sheet. A pin 135 may then be passed through the openings and a clamp 136 attached to opposite sides of the group. The sheets may then be bent with a second clamp 137 placed on the opposite sides of the other end 138 as is illustrated by the dotted lines in Fig. 20. The group of sheets 132 may then be given any suitable shape as is illustrated in Figs. 19 to 23. Thus the central portions of the sheet are held relatively straight through movable blocks 139 and the ends are formed into right angularly extending legs by means of movable pistons 140. The core may then be supported in that position through the plates 139 and a bracket including plates 141 and interconnecting rods 142. The core may then be annealed in this position, and after annealing it can be assembled with a preformed coil. Two core portions as shown in Fig. 23 may be stacked together and then annealed, if desired. It will be understood that the core construction described in Figs. 18 to 23 may be employed where the sheets are relatively long and relatively flexible.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States, is:

1. A curved iron type core including two generally U-shaped core portions assembled to provide a closed magnetic core, each of said core portions comprising a plurality of nested flatwise curved strain-free strips of magnetic material providing continuous magnetic paths at corners, the strips of one of said portions all being the same length with their centers in radial alignment whereby their ends are stepped, the strips of the other of said portions having their centers in radial alignment and being of such different lengths that their ends are stepped in complementary fashion to the ends of the equal length strips, said portions being forced together whereby said stepped ends form progressively staggered closely fitting overlapping scarfed butt joints.

2. A curved iron type core including two generally U-shaped core portions assembled to provide a closed magnetic core, each of said core portions comprising a plurality of nested flatwise curved strain-free strips of magnetic material providing continuous magnetic paths at the corners, the strips of one of said portions all being the same length, the strips of the other of said portions being of such progressively different lengths that their ends make butt contact respectively with the ends of radially corresponding strips in said one portion.

GARETH G. SOMERVILLE.

REFERENCES CITED

The following references are of record in the file of this patent:

UNITED STATES PATENTS

| Number | Name | Date |
|---|---|---|
| 523,572 | Hassler | July 24, 1894 |
| 1,102,513 | Johannesen | July 7, 1914 |
| 1,285,996 | Hensley | Nov. 26, 1918 |
| 1,858,225 | Frederick | May 10, 1932 |
| 1,935,426 | Acly | Nov. 14, 1933 |
| 2,058,362 | Smalley | Oct. 20, 1936 |
| 2,066,186 | Mitchell | Dec. 29, 1936 |
| 2,288,855 | Steinmayer | July 7, 1942 |
| 2,290,680 | Franz | July 21, 1942 |
| 2,293,951 | Seastone | Aug. 25, 1942 |
| 2,318,095 | Putnam | May 4, 1943 |
| 2,333,995 | Gaynor | Nov. 9, 1943 |
| 2,380,300 | Gaston | July 10, 1945 |
| 2,456,457 | Somerville | Dec. 14, 1948 |
| 2,456,458 | Somerville | Dec. 14, 1948 |

FOREIGN PATENTS

| Number | Country | Date |
|---|---|---|
| 7,856 | Great Britain | May 10, 1889 |
| 106,986 | Great Britain | June 14, 1917 |
| 364,346 | Germany | Nov. 23, 1922 |